(12) United States Patent
Sanchez et al.

(10) Patent No.: US 7,849,503 B2
(45) Date of Patent: Dec. 7, 2010

(54) PACKET PROCESSING USING DISTRIBUTION ALGORITHMS

(75) Inventors: Mauricio Sanchez, Roseville, CA (US); Bruce E. LaVigne, Roseville, CA (US); Alan R. Albrecht, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 629 days.

(21) Appl. No.: 11/809,512

(22) Filed: Jun. 1, 2007

(65) Prior Publication Data
US 2008/0298392 A1 Dec. 4, 2008

(51) Int. Cl.
*G06F 17/00* (2006.01)
(52) U.S. Cl. .............................. 726/13; 726/11; 726/14; 726/23
(58) Field of Classification Search ...................... 726/1, 726/11, 13, 14, 22, 23, 24, 25; 713/188, 713/189, 190
See application file for complete search history.

(56) References Cited

U.S. PATENT DOCUMENTS

| 6,763,018 | B1 | 7/2004 | Puthiyandyil et al. |
| 7,103,045 | B2 | 9/2006 | Lavigne et al. |
| 7,111,072 | B1 | 9/2006 | Matthews et al. |
| 7,159,242 | B2 | 1/2007 | Genty et al. |
| 2003/0101353 | A1* | 5/2003 | Tarquini et al. .............. 713/200 |
| 2005/0114522 | A1 | 5/2005 | LaVigne et al. |
| 2005/0220091 | A1 | 10/2005 | LaVigne et al. |
| 2005/0220092 | A1 | 10/2005 | LaVigne et al. |
| 2006/0191008 | A1* | 8/2006 | Fernando et al. .............. 726/23 |
| 2007/0208854 | A1* | 9/2007 | Wiryaman et al. .......... 709/225 |
| 2009/0119745 | A1* | 5/2009 | Chung et al. ................... 726/1 |

* cited by examiner

*Primary Examiner*—Chi H Pham
*Assistant Examiner*—Weibin Huang

(57) ABSTRACT

Network devices, systems, and methods are provided for packet processing. One method includes receiving a checking functionality rule set as an input to a distribution algorithm. The method includes bifurcating and providing configuration instructions, as an output from the distribution algorithm, to a first logic plane associated with a first logical entity and a second logic plane associated with a second logical entity. A collaboration algorithm is used to provide processing coordination between the first logical entity and the second logical entity.

15 Claims, 7 Drawing Sheets

PACKET PROCESSING USING DISTRIBUTION ALGORITHMS

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or wide area network (WAN).

Networks can include a network appliance (NA), e.g., intrusion prevention system (IPS) and/or intrusion detection system (IDS) that serves to detect unwanted intrusions/activities to the computer network. Unwanted network intrusions/activities may take the form of attacks through computer viruses and/or hackers, among others, trying to access the network. To this end, a NA can identify different types of suspicious network traffic and network device usage that can not be detected by a conventional firewall. This includes network attacks against vulnerable services, data driven attacks on applications, host based attacks such as privilege escalation, denial of service attacks, port scans, unauthorized logins and access to sensitive files, viruses, Trojan horses, and worms, among others. A NA can also include other forms of diagnostic devices, accounting devices, counting devices, etc., operable on network packets of interest.

Network appliances are a class of products that provide network security services such as firewalling, intrusion detection, content filtering, spam filtering, and/or virtual private networks (VPNs). Network appliances arose and evolved independently of traditional high-speed network infrastructure devices such as routers, switches, bridges, etc. However, the underpinnings of modern network appliances are in fact a bridging or routing engine that in many instances replicates the functionality of the traditional high-speed network infrastructure device.

Network appliances, e.g., IPS/IDSs, counting/accounting, or diagnostic devices, may be slower than other network devices, such as switches and routers, and hence have slower throughput. Additionally, network appliances tend to replicate bridging and routing functions that have already been well-optimized and are significantly faster in network infrastructure devices, e.g., routers, switches, etc. For example, network devices have become more "intelligent" in their decision making capability at very fast speeds, e.g., 100+ Gbps. In contrast, network appliances can be several orders of magnitude slower in terms of throughput as compared to such modern high-speed network devices. Network appliances also tend to introduce latency issues when compared to network devices. Latency is a troublesome facet to introduce into a network because it negatively effects real time applications such as voice over IP (VoIP), e.g., latency can cause choppiness in conversations, etc., or storage area networks (SANs), e.g., latency can cause slow file operations.

Previous approaches have endeavored to put more processing power in the network appliance. However, while adding more raw processing power to a network appliance does improve its capability, the net return on improvement does not usually justify the cost added to realize that improvement.

DETAILED DESCRIPTION

Figure 1:
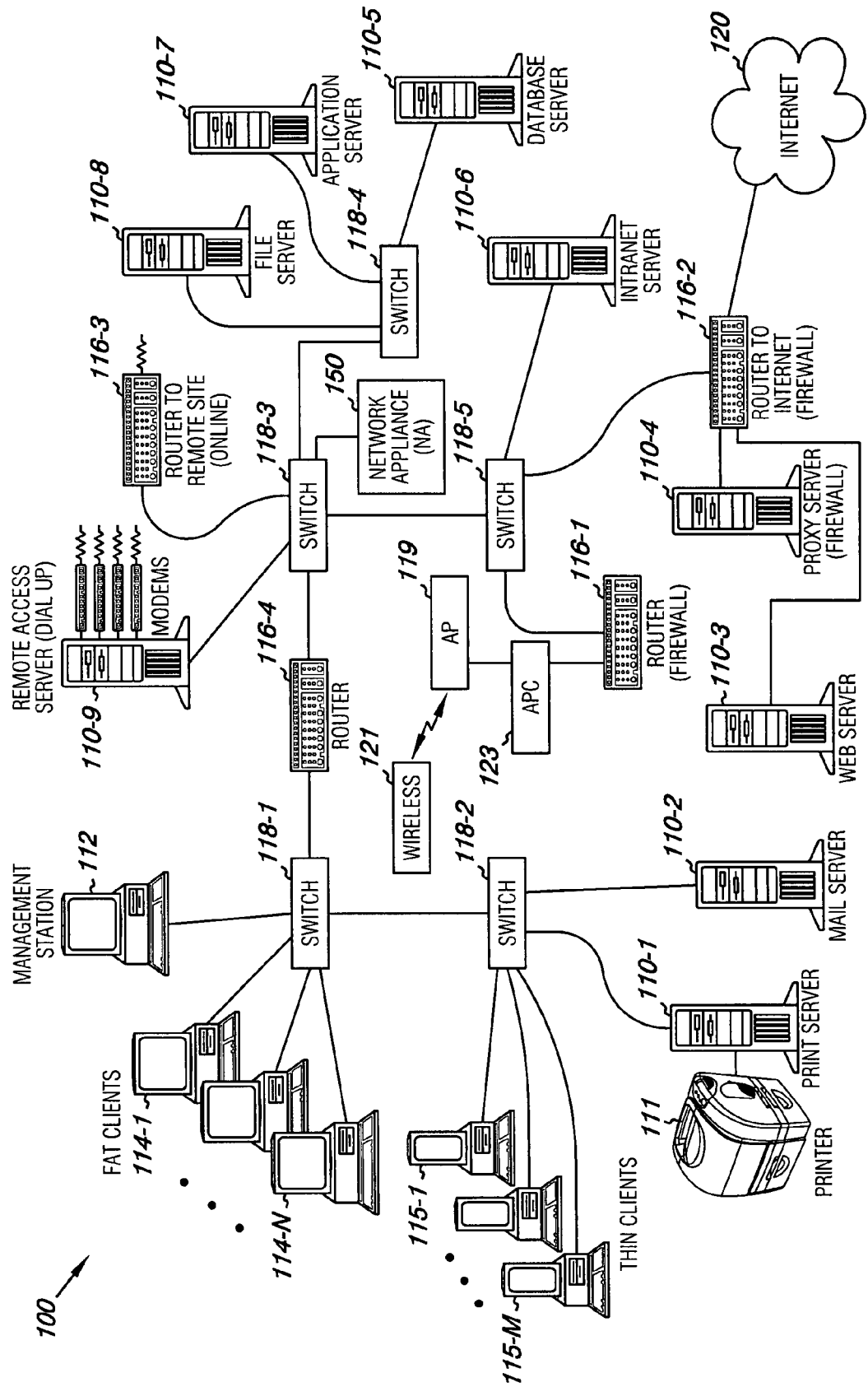
FIG. 1 is an example of a computing device network in which certain embodiments of the invention can be implemented.

Embodiments of the present invention may include network devices, systems, and methods for packet processing. One method includes receiving a checking functionality rule set as an input to a distribution algorithm. The method includes bifurcating and providing configuration instructions, as an output from the distribution algorithm, to a first logic plane associated with a first logical entity and to a second logic plane associated with a second logical entity. The method further includes using a collaboration algorithm to provide processing coordination between the first logical entity and the second logical entity.

In some embodiments, the method includes configuring a first logical entity, e.g., a network device, with a number of pre-conditions which have to be met before a pattern search is invoked on network packets by a second logical entity, e.g., a checking functionality. The method includes using the first logical entity to process packet header information, such as those in layer 2 to layer 4, associated with network packets. The method includes determining whether the number of pre-conditions has been satisfied while processing packet header information. The method further includes providing bi-directional communication between the first logical entity and the second logical entity. Embodiments described herein allow for the efficient collaboration of checking functionality and a network device to reduce work duplication and increase performance.

As used herein, "checking functionality" (CF) means an intrusion prevention system (IPS), an intrusion detection system (IDS), and can also include other forms of security devices, diagnostic devices, accounting devices, counting devices, etc., operable on network packets of interest, whether connected as a network appliance (e.g., 250-1 or 250-2 as described in connection with FIG. 2) or whether provided as logic integral to a particular network device (e.g., 241, 270, 260, or 265, as described in connection with FIG. 2).

A checking functionality can include a network appliance supplied by a third party vendor of network security devices or otherwise. As used herein, the term "network appliance" is used to mean an add-on device, e.g., "plug-in" or "application module" (as defined below), to a network as contrasted with a "network device", e.g., router, switch, and/or hub, etc., which are sometimes considered more as "backbone" component devices to a network. The operations of such devices will be recognized and understood by one of ordinary skill in the art. A checking functionality can be provided in the form of software, application modules, application specific integrated circuit (ASIC) logic, and/or executable instructions operable on the systems and devices shown herein or otherwise.

"Software", e.g., computer executable instructions as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (such as Flash memory), etc.

An "application module" means a self-contained hardware or software component that interacts with a larger system. As the reader will appreciate a software module may come in the form of a file and handle a specific task within a larger software system. A hardware module may be a separate set of logic, e.g., transistor/circuitry gates, that "plug-in" as a card, appliance, or otherwise, to a larger system/device.

In some embodiments, software and/or logic in the form of hardware, e.g. application specific integrated circuits (ASICs) on a network chip, receives a network packet. The software and/or logic processes network packets on ingress to a network chip (defined below), e.g., using a first logical entity (ASIC) for processing well-known packet header information, such as layer 2 to layer 4, associated with the network packets, in order to determine whether a number of pre-conditions have been met before higher orders of analysis, such as data content matching are invoked on the network packets by a second logical entity, e.g., a checking functionality. The software and/or logic is further operable to establish a bi-directional communication path between the first logical entity and the second logical entity According to embodiments, the software and/or logic can dynamically configure the first logical entity with a number of pre-conditions selected from the group of; a physical source port, a source media access controller (MAC_SA) address, a destination media access controller (MAC_DA) address, a source IP address (IP SA), a destination IP address (IP DA), a protocol ("traffic") type, a TCP/UDP source port number, a TCP/UDP destination port number, an IP flow, a port being connected to a wireless network, etc. The software and/or logic can additionally configure the second logical entity with a set of pattern indices associated with the number of pre-conditions. Embodiments, however, are not limited using pattern indices to perform pattern matching, but can include sample based analysis and behavioral analysis, etc.

As explained in more detail below, embodiments of the present invention use a combination of a distribution algorithm and a collaboration algorithm. The distribution algorithm executes instructions to decide how to distribute packet analysis between different entities, e.g., a switch and an checking functionality, in a given network. The collaboration algorithm is used to communicate between the different entities, e.g., the switch and the checking functionality, that there is some set of packets that need additional processing, e.g., pattern matching.

In some embodiments, the checking functionality only operates, e.g., performs pattern searches, on packets when a number of pre-conditions has been satisfied. Using the bi-directional communication path checking functionality communicates a status associated with packets which have been operated on to the network device. The network device can then operate on network packets based on the status communicated from the checking functionality. According to some embodiments, the checking functionality can operate on a set of pattern indices associated with packet traffic and communicate a status back to the network device without processing the same packet information already processed by the first logical entity. Hence, embodiments of the present invention focus the efforts of the checking functionality on the packet checking role while not duplicating the packet processing functionality of the network device to improve throughput and reduce latency issues for the network.

FIG. 1 illustrates an embodiment of a computing device network 100 in which some embodiments of the invention can be implemented. As shown in FIG. 1, a number devices can be networked together in a LAN, WAN and/or metropolitan area network (MAN) via routers, hubs, switches and the like. As used herein a "network device" means a switch, router, hub, bridge, etc., e.g., a device which may have a processor and memory resources, and is connected to a network 100, as the same will be understood by one of ordinary skill in the art. Although a switch will often be used in this disclosure in describing certain embodiments of the invention, those skilled in the art will realize that embodiments may be implemented with other network devices. As the reader will appreciate, the term network device can also be used to refer to servers, PCs, etc., as illustrated further below.

As used herein, a "network" can provide a communication system that links two or more computers and peripheral devices, and allows users to access resources on other computers and exchange messages with other users. A network allows users to share resources on their own systems with other network users and to access information on centrally located systems or systems that are located at remote offices. It may provide connections to the Internet or to the networks of other organizations. Users may interact with network-enabled software applications to make a network request, such as to get a file or print on a network printer. Applications may also communicate with network management software, which can interact with network hardware to transmit information between devices on the network.

The example network of FIG. 1 illustrates a print server 110-1 and printer 111 to handle print jobs for the network 100, a mail server 110-2, a web server 110-3, a proxy server (firewall) 110-4, a database server 110-5, an intranet server 110-6, an application server 110-7, a file server 110-8, and a remote access server 110-9. The examples described here do not provide an exhaustive list of servers that may be used in a network.

The network embodiment of FIG. 1 further illustrates a network management station 112, e.g., a server, PC and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks using routers, 116-1, 116-2, 116-3, and 116-4, and hubs and/or switches 118-1, 118-2, 118-3, 118-4, and 118-5. As noted above, such network devices can include a processor in communication with a memory and may include network chips having hardware logic, e.g., in the form of application specific integrated circuits (ASICs), associated with the number of network ports. The term "network" as used herein is not limited to the number, type, and/or quantity of network devices illustrated in FIG. 1.

Additionally as the reader will appreciate, a number of mobile devices, e.g., wireless device 121, can connect to the network 100 via a wireless air interface (e.g., 802.11) which can provide a signal link between the mobile device 121 and an access point (AP) 119. The AP 119 serves a similar role to a base station in a wireless network, as the same will be known and understood by one of ordinary skill in the art. As shown in FIG. 1, the AP 119 can be linked to an access point controller (APC) 123, as the same will be known and understood by one of ordinary skill in the art, which connects the AP 119 over a packet switched signal link, e.g. an Ethernet link, to other network devices, e.g., router 116-1.

Program instructions (e.g., computer executable instructions), as described in more detail here, can reside on some network devices. For example, program instructions in the form of firmware, application modules, and/or software (both in the form of executable instructions) can be resident on the network 100 in the memory of a network management station 112 and/or one or more routers, 116-1, 116-2, 116-3, 116-4, hubs, and/or switches 118-1, 118-2, 118-3, 1184, 118-5, etc., and can be executable by the processor(s) and/or logic (e.g., hardware in the form of transistor gates) thereon. Also, program instructions can be resident in a number of locations on some network devices in the network 100 as can be employed in a distributed computing network. A "distributed computing network" refers to the use of multiple computing devices, e.g., having processor and memory resources, in a network to execute various roles, e.g., application processing, etc., as described herein.

As one of ordinary skill in the art will appreciate, each network device in the network 100 can be physically associated with a port of a switch to which it is connected. Information in the form of network packets, e.g., data packets, can be passed through the network 100. Users physically connect to the network through ports or APCs 123 on the network 100. Data frames, or packets, can be transferred between network devices by means of a network device's, e.g., switch's, logic link control (LLC)/media access control (MAC) circuitry, or "engines," as associated with ports on a network device. A network switch forwards network packets received from a transmitting network device to a destination network device based on the header information in received network packets. A network device can also forward packets from a given network to other networks through ports on one or more other network devices. As the reader will appreciate, an Ethernet network is described herein. However, embodiments are not limited to use in an Ethernet network, and may be equally well suited to other network types, e.g., asynchronous transfer mode (ATM) networks, etc.

According to embodiments described herein, a checking functionality, e.g., a network appliance intrusion system (IS) which serves to detect and/or evaluate suspicious activity, can be located in a "centralized" location in network 100. As used herein, the term "centralized" means a particular location in the network 100 accessible from a number of network devices, e.g., 118-1, . . . , 118-5, whether or not the topographical location is in-line with a given packet's intended network path or topographically central to the network 100. To further explain, in network 100 of FIG. 1, certain network devices, e.g., switches 118-1, 118-2, and 118-5, may be referred to topographically as "edge network devices" and other network devices, e.g., switches 118-3 and router 116-4, may be referred to topographically as "central network devices". As used herein, "edge network devices" topographically means network devices, e.g., 118-1, having ports connected directly to network clients, 115 and 114-1, . . . 114-N on the "edge" of a network. The network clients can include servers, "fat" and "thin" clients, including mobile network clients connected through an APC, etc., as discussed above. As used herein, "central network devices" topographically means network devices, e.g., 118-3, which are connected to other network devices, 118-2, but which are not necessarily connected directly to network clients such as 115 and 114-1, . . . 114-N, etc.

However, the term "central" in central network devices is not to be confused with the use of the term "centralized". In some embodiments, a "centralized" CF, as defined above, may be integral to or associated with an edge network device. That is, the topographical location in a given network of the CF can be in association with switch 118-1, connected to "fat" and "thin" clients, 114-1, . . . , 114-N, and 115-1, . . . , 115-M, in FIG. 1, or equally in association with switch 118-3, or switch 118-5, etc. Embodiments are not limited to the examples described herein. As one or ordinary skill in the art will appreciate, the intent is to place an CF in a topographical location in network 100 which has a sufficiently high bandwidth associated therewith relative to the bandwidth of other devices attached to the network 100 to perform a sufficient throughput associated with a particular CF. As the reader will appreciate, certain so termed "edge network devices", e.g., switch 118-1, may in fact have a large network packet traffic bandwidth capability relative to other network devices, e.g., 118-3, 1184, etc., in the network 100 so as to be worthwhile candidates for associating a CF therewith. Embodiments are not limited to the examples given in connection with FIG. 1.

In the example network implementation of FIG. 1, a network appliance 150 is shown in association with switch 118-3. The network appliance 150 serves as a checking functionality. As the reader will appreciate, a network appliance 150 can include processor and memory resources capable of storing and executing instructions to perform a particular role or function. A network appliance can also include one or more network chips (e.g., ASICs) having logic and a number of ports.

In certain embodiments, the checking functionality performed by the network appliance 150 can perform the role of an intrusion prevention system (IPS), as may be supplied by a third party vendor of network security devices. In certain embodiments, the checking functionality performed by the network appliance 150 can perform the role of an intrusion detection system (IDS), or another diagnostic device, accounting device, counting device, etc., as may be supplied by a third party vendor. Embodiments are not limited to the examples given here. The various configurations and operations of such different checking functionalities are known and understood by one of ordinary skill in the art.

Figure 2:
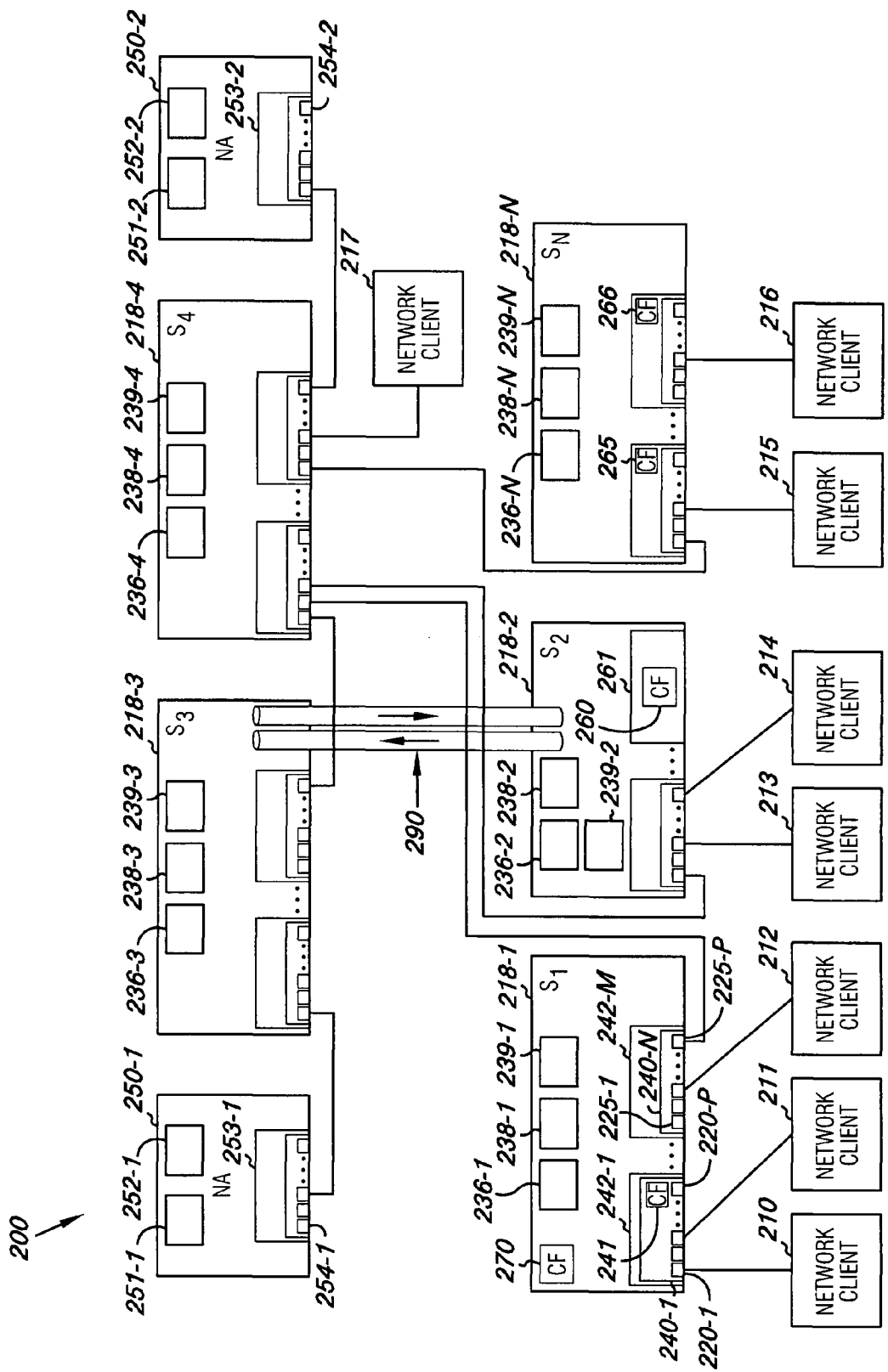
FIG. 2 illustrates a portion of a network, such as shown in FIG. 1, which includes network devices in which certain embodiments of the present invention can be implemented.

FIG. 2 illustrates a portion 200 of a network, e.g., network 100 shown in FIG. 1, including embodiments of network devices, 218-1, 218-2, . . . 218-N, e.g., "first logical entities", suited to implement embodiments of the present invention. By way of illustration and not by way of limitation, some of the network devices are "edge network devices", e.g., 218-1, having ports connected directly to network clients, 210, . . . , 217. The network clients can include "fat" and "thin" clients, including mobile network clients connected through an APC 123, etc., as discussed above in connection with FIG. 1. Additionally, by way of illustration and not by way of limitation, some of the network devices are "central network devices", e.g., 218-3 which are connected to other network devices, e.g., 218-4, but which are not be connected directly to network clients, 210, . . . , 217, mobile devices, etc.

As described in connection with FIG. 1, the network devices, 218-1, 218-2, . . . 218-N, of FIG. 2 can include switches, routers, hubs, etc. (shown as switches in FIG. 2).

Such network devices, 218-1, 218-2, . . . 218-N, can include processor, e.g., 236-1, . . . , 236-N, and memory, e.g., 238-1, . . . , 238-N, resources. The network devices, 218-1, 218-2, . . . 218-N, can similarly include a number of printed circuit boards, or "blades", 242-1, . . . , 242-M, which can include a number of network chips, e.g., 240-1, . . . , 240-N, including logic circuitry (hardware). Each network chip, 240-1, . . . , 240-N, can include a number of network ports, 220-1, 220-2, . . . , 220-P to send and receive data packets (network traffic) throughout the network 200. The logic circuitry of the number of network chips, e.g., 240-1, . . . , 240-N, can be in the form of an application specific integrated circuit (ASIC) and include logic to serve as a media access controller (MAC).

As shown in FIG. 2, the number of ports 220-1, 220-2, . . . , 220-P can be included on a network chip 240-1, . . . , 240-N and have access to logic circuitry associated with any of the network chips 240-1, . . . , 240-N and to the processor 236-1, . . . , 236-N and memory 238-1, . . . , 238-N through a crossbar, crosslink, and/or switching fabric 239-1, . . . , 239-N as the same will be understood by one of ordinary skill in the art. As used herein, the designators "M", "N", and "P" are used to illustrate that networks can have a number of network devices, that a given network device may have a number of blades, and that the network devices may support or contain a different number of ports. Embodiments are not limited to the example shown in FIG. 2.

As shown in the embodiment of FIG. 2, network appliances 250-1 and 250-2 can be connected to a network device in a centralized location. The centralized location may be connected to a central network device, e.g., 218-3 (network device not connected directly to network clients), or may be connected to an edge network device, e.g. 218-4 (network device connected directly to network clients). As shown in FIG. 2, a given network appliance 250-1 can include processor 251-1 and memory 252-1 resources capable of storing and executing instructions to perform a particular role or function. The network appliance can also include one or more chips (ASICs), e.g., 253-1, having logic and a number of ports 254-1, as the same have been described above.

The network appliances 250-1 and 250-2 can serve as a checking functionality, e.g., "second logical entity". As also shown in the embodiment of FIG. 2, in some embodiments, a checking functionality (CF), e.g., "second logical entities", may be embedded, either within a network device's ASIC (e.g., 241), or on the port blades (265, 266), or just within the network device itself, either as a service or security plug-in blade (e.g., CF 260 on plug-in blade 261), or built in to the network device (e.g., 270). Embodiments of the invention are not limited to the actual location of the checking functionality with the network 200.

Although the illustration of FIG. 2 appears to illustrate one network chip, e.g., 240-1, per blade, e.g., 242-1, and two blades per network device, one of ordinary skill in the art will appreciate that a given network device 218-1 can include a number of blades, each having a number of network chips, and each chip having a number of network ports.

As described in connection with FIG. 1, the CF can be an intrusion detections system (IDS), or another diagnostic device, accounting device, counting device, etc., as may be supplied by a third party vendor of network checking devices. Embodiments are not limited to the examples given here.

In the embodiment of FIG. 2, a network packet, e.g., data packet, is received by a port, e.g., 220-1, on a network device, e.g., switch 218-1, from a network client, e.g., 210. According to embodiments, the network device is configured with a number of pre-conditions which the logic on the network device 218-1, e.g., logic associated with an ASIC of a network chip 240-1, is able to apply to received packets. The network chip 240-1 logic, e.g., first logical entity, is able to determine whether the received packet matches the number of pre-conditions while processing packet header information, such as layer 2 to layer 4. As described in more detail next in connection with FIG. 3, computer executable instructions stored in memory are executed by a processor, e.g., on a network device such as network management station 112 in FIG. 1, to provide the pre-conditions to the switch 218-1.

Figure 3:
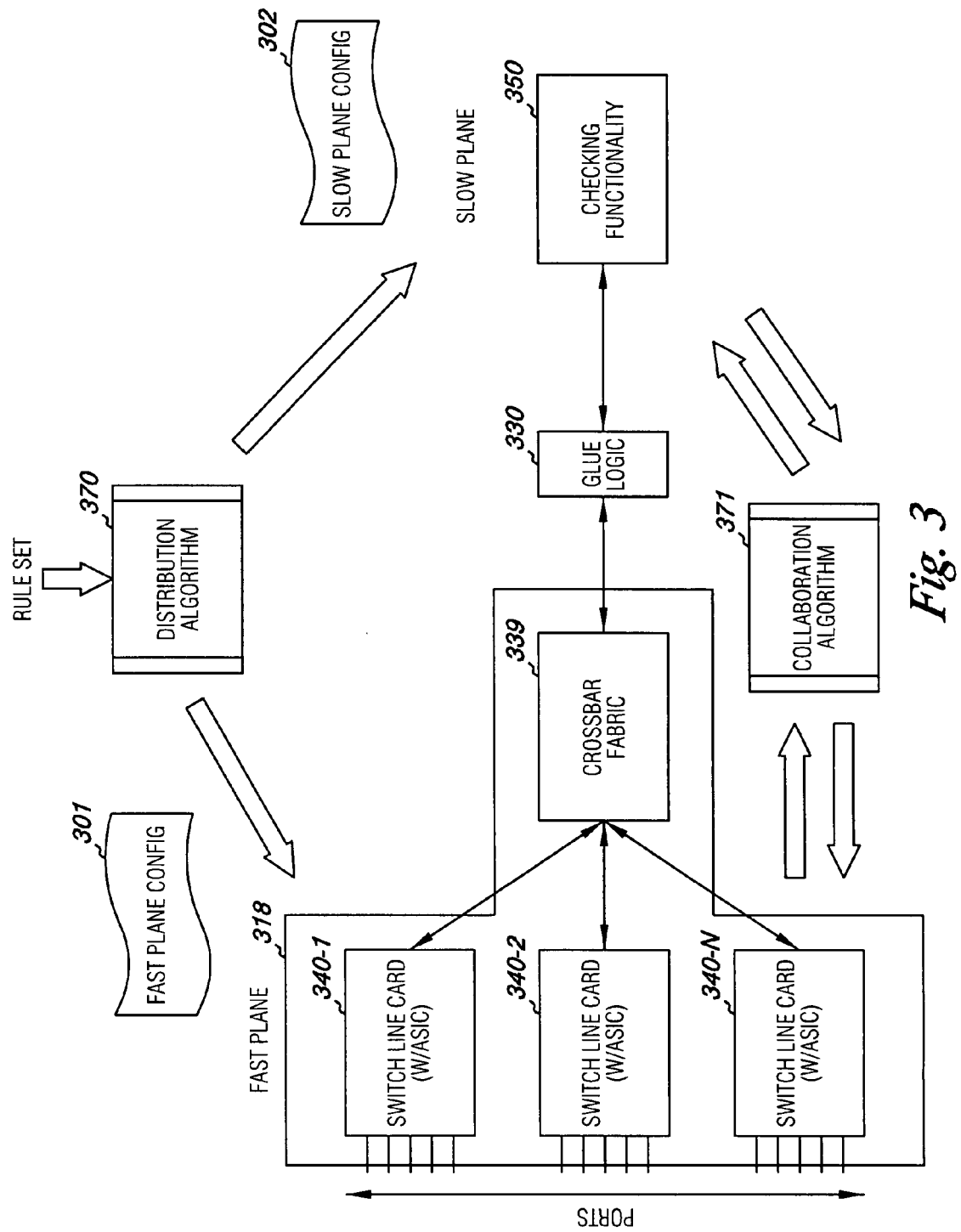
FIG. 3 illustrates one embodiment implementing a distribution algorithm and a collaboration algorithm in association with a first logical entity and a second logical entity.

FIG. 3 illustrates one embodiment implementing a distribution algorithm 370 and a collaboration algorithm 371 in association with a first logical entity 318, e.g., switch 218-1 in FIG. 2, and a second logical entity 350, e.g., a checking functionality 250-1, 250-2, 241, 270, 260, 265, etc. in FIG. 2. As shown in FIG. 3, the switch 318 includes a number of network chips 340-1, 340-2, . . . , 340-N (e.g., switch line cards with ASICs) which include ports to receive network packet traffic. The switch also includes crossbar switching fabric 339 as the same has been noted in FIG. 2 to apply packet forwarding logic. As shown in FIG. 3, other glue logic 330, as the same will be appreciated by one of ordinary skill in the art, can connect packets with a checking functionality 350. For reasons described in the background, the switch 318 is referred to herein as a fast processing logic plane do to the speed with which the ASIC hardware can process packet traffic. In contrast, the checking functionality 350 with its higher order packet analysis functionality, e.g., pattern matching capabilities, is referred to herein as a slow processing logic plane than the ASICs.

As shown in the example embodiment of FIG. 3, a checking functionality rule set, e.g., IPS signatures, can be provided as an input to the distribution algorithm 370, e.g., on system boot, etc. As the reader will appreciate, the checking functionality rule set includes rules that match against specific packet and/or data parameters. For example, the rules can establish a number of pre-conditions which must be met before processing packets at higher orders of analysis, such as data content matching, will be invoked. The number of pre-conditions can include a number of criteria, such as an IP flow of packets. As the reader will appreciate an IP flow is identified by a source IP address and a destination IP address, e.g. a pair of IP addresses. In some embodiments the number of checking functionality rules (pre-conditions) provided as an input to the distribution algorithm include information specifying a physical source port, a source media access controller (MAC_SA) address, a destination media access controller (MAC_DA) address, a source IP address (IP SA), a destination IP address (IP DA), a protocol ("traffic") type, a TCP/UDP source port number, a TCP/UDP destination port number, an IP flow; a source VLAN, a port being connected to a wireless network, etc.

The distribution algorithm 370 shown in FIG. 3 may be executed on a network management station, e.g., 112 in FIG. 1. However, embodiments are not so limited. Nominally, switch ASICs can process packet traffic faster than a checking functionality such as an IPS. However, the switch ASICs may be less flexible with respect to packet traffic processing than an IPS. Hence, according to embodiments, instructions associated with the distribution algorithm execute to parse the checking functionality rule set and generate two new instruction sets, e.g., one set of configuration instructions for the switch 318 and another set of configuration instructions for the checking functionality 350 such that each set of configuration instructions leverages the capabilities and resources of the switch and checking functionality, respectively.

Figure 4:
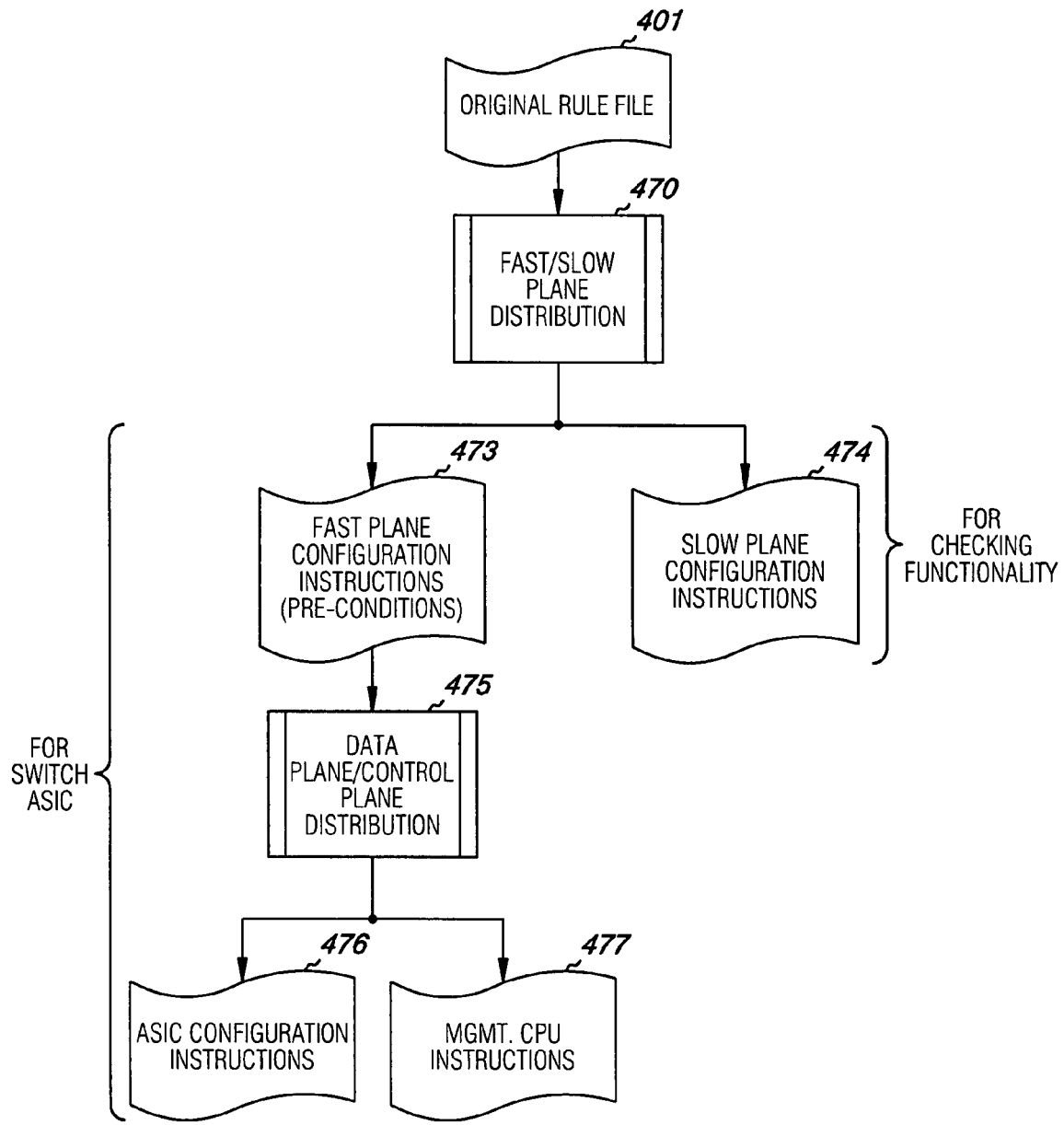
FIG. 4 is a flow diagram illustrating an operation for one embodiment of a distribution algorithm.

FIG. 4 is a flow diagram illustrating the operation for one embodiment of the distribution algorithm. As shown in the example embodiment of FIG. 4, an original rule file 401 can be provided as an input to the distribution algorithm 470. Instructions associated with the distribution algorithm are executed to provide first logic plane configuration instructions 473 to the switch, e.g., "fast logic plane configuration instructions", for use by the switch ASIC. Distribution algorithm 470 also executes instructions to provide second logic plane configuration instructions 474 to the checking functionality, e.g., "slower logic plane configuration instructions", for use in checking functionality operations, e.g., pattern searching, packet content matching, sampling, behavioral analysis, etc.

The following description provides one example embodiment describing the distribution algorithm's application to two checking functionality rules and the output instructions that can be expected for both the switch ASIC and the checking functionality, e.g., configuration instructions provided to the first logic plane and second logic plane. In this example, the checking functionality provides the rule sets which determine when and what patterns to look for depending on packet header information processing, such as layer 2 to layer 4 (L2-L4), by the switch ASIC and a state of a given session. This is the point the distribution algorithm comes into play, namely to tease apart the packet header work from the pattern recognition work. By way of example and not by way of limitation, the checking functionality rule (RULE) sets are:

1. sdrop tcp 15.255.16.0/24 10101->15.255.20.0/24 and (msg:"SCAN myscan"; flow:stateless; ack:0; flags:S; ttl: >220; reference:arachnids, 439; classtype:attempted-recon; sid:613; rev:6;)

2. alert tcp 15.255.16.0/24 any->15.255.20.0/24 113 (msg: "SCAN ident version request"; flow: to_server, established; content: "VERSION I0AI"; depth:16; reference:arachnids, 303; classtype:attempted-recon; sid: 616; rev:4;)

As the reader will appreciate, the above rule examples are examples of IPS rules associated with the open source intrusion prevention system (IPS) Snort®. Snort® is a popular open-source IPS that consists of a collection of protocol engines that look for attacks defined by their "signature". The signatures are configuration rules and the syntax used is one of the more well-known of IPS syntaxes for its straightforward structure. The Snort® IPS rules above are used as a basis for describing the operation of embodiments of the distribution and collaboration algorithms. However, embodiments are not limited to these example IPS rules.

In the above example, Rule #1 is a reconnaissance scan using MYSCAN approach. In its first pass, the distribution algorithm executes instructions to create the fast and slow logic plane configuration instructions for the switch ASIC 473 and the checking functionality 474, respectively. The distribution algorithm takes into account the capabilities of the given switch ASIC. For this rule, the result of the distribution algorithm is that the switch ASIC is capable of servicing all fields used to match for this attack. Since the checking functionality no longer has to process this rule, the methodology has effectively offloaded this work and thereby has lessened the checking functionality's workload which can thus improve its overall performance. It is noted that the collaboration algorithm described further below is not necessary whatsoever for this rule.

In its second pass, the distribution algorithm executes instructions to pass through the switch instruction set, e.g., data plane/control plane distribution 475, and create yet another set of instructions, namely ASIC primitives 476 and switch CPU management instructions 477.

For this first rule, e.g., RULE #1, the ASIC primitives may consist of (in pseudo code):
For each incoming packet:
IF (source_ip==15.255.16.x && dest_ip==15.255.20.x && ip_ttl>220 && ip_proto==6 && src_port==10101 && tcp_ack_val==0 && tcp_flag==SYN)
THEN drop packet There are no switch CPU management instructions, since this rule specifies a silent drop (sdrop) for which no alert need be generated.

Rule #2 is a reconnaissance scan looking for 'ident' servers. In contrast to Rule #1, this rule contains elements that the switch ASIC cannot natively support, namely data pattern match within the stream payload. For this rule the distribution algorithm will create two set of instructions, one of for the switch ASIC and one for the checking functionality.

The switch ASIC instructions will encode the portion of the rule that the switch ASIC can natively support. Here, the ASIC primitives may consist of (in pseudo code):
For each incoming packet:
IF (source_ip==15.255.16.x && destjip==15.255.20.x && ip_proto==6 && dst_port==113 && tcp_est==true)
THEN steal packet to IPS.

The checking functionality instructions will encode the portion of the rule that the switch ASIC cannot natively encode, e.g., the data pattern match within the stream payload. Using pseudo code, the instructions could be:
For each packet from the switch ASIC:
<perform any necessary data pre-processing (e.g., TCP reassembly)>
Inspect data payload for up to 16 bytes looking for data pattern "VERSION I0AI"
IF (pattern found)
THEN generate alert and log packet.

Figure 5A:
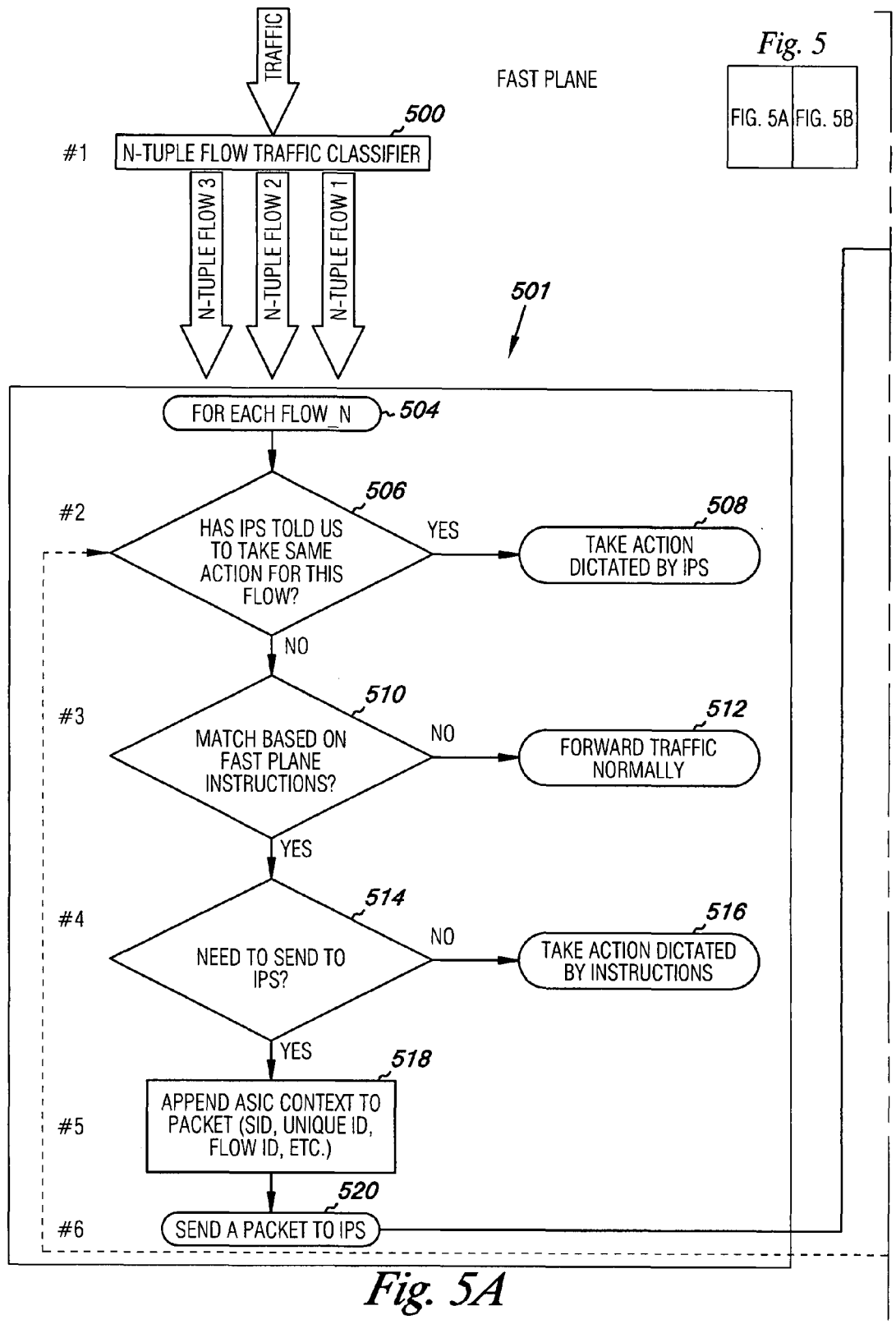
FIG. 5 is a flow diagram illustrating an operation for one embodiment of a collaboration algorithm.
Figure 5B:
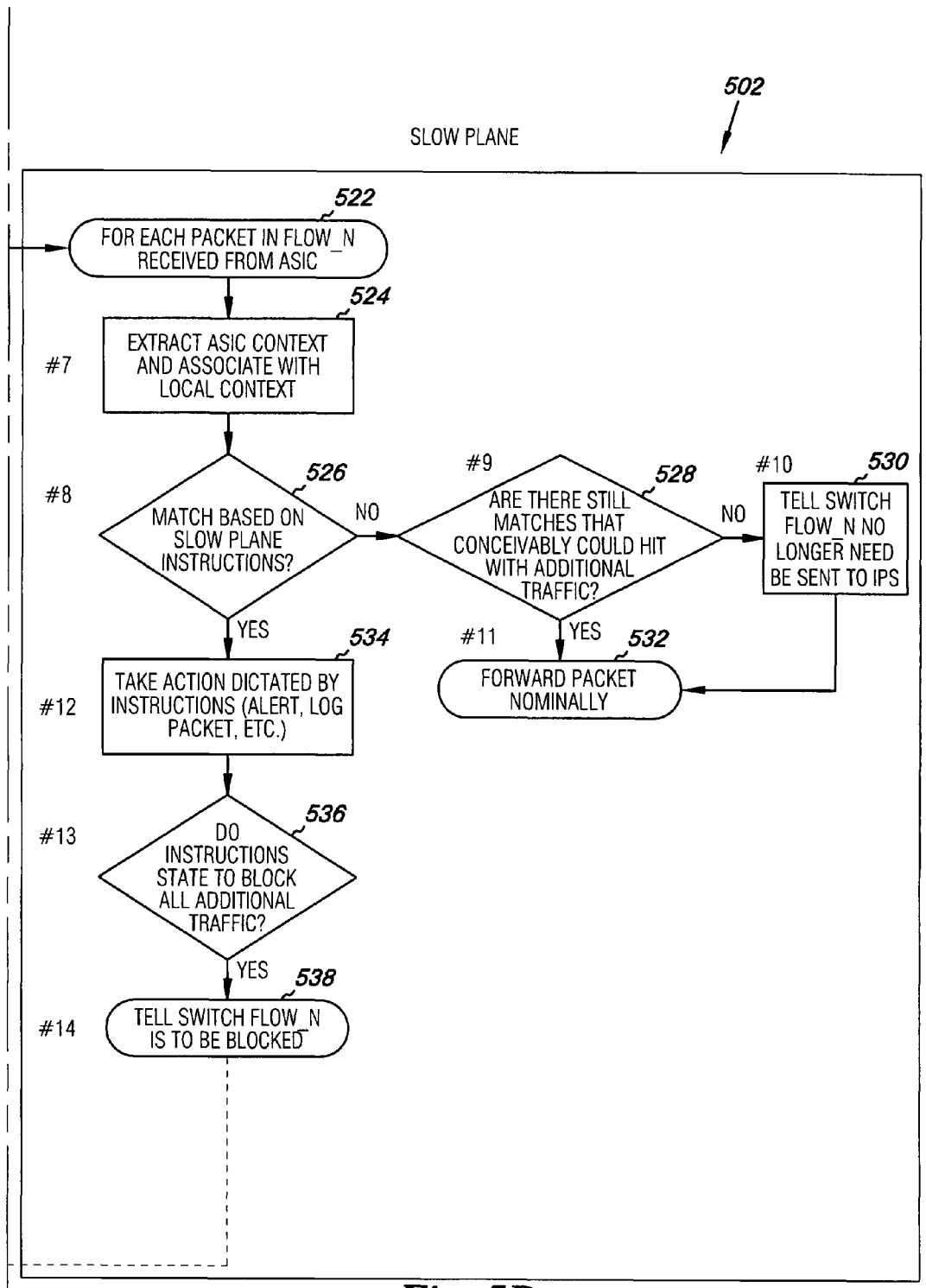

FIG. 5 is a flow diagram illustrating the operation for one embodiment of the collaboration algorithm. The collaboration algorithm provides processing coordination between the different processing entities, e.g., switch ASIC and checking functionality. The collaboration algorithm employs a protocol that facilitates the processing of packet traffic given the distributed set of instructions (i.e., the fast and slow logic plane instructions) created by the distribution algorithm.

The nominal inputs in the coordination engine are as follows:
The slow and fast logic plane instructions generated by the distribution algorithm
N-tuple flow information.

The general execution flow of the collaboration algorithm is depicted in FIG. 5. The operation of one embodiment of the collaboration algorithm is described in the following text by referencing the numbered stages in FIG. 5.

In stage #1 packet traffic arrives at the first (e.g., "fast") logic plane in aggregated and undifferentiated form and the first step taken is to split the incoming traffic into n-tuple flows 500. N-tuple flows is merely a collection of packets that share a common set (n-tuple) characteristics. In one example embodiment, the n-tuple is implanted as a 5-tuple (ip source, ip destination, layer 4 type, layer 4 src, layer 4 destination). Once traffic has been splayed into their respective flow, each one 504 enters the collaboration algorithm processing between the first logic plane 501 and the second (e.g., "slow") logic plane 502. The first check performed on the packet, shown at stage #2, is whether this packet is part of a flow that the checking functionality told the switch already to do something with 506. For example, the checking functionality may have identified the flow as malicious, meaning that all packets associated with that flow should be blocked, logged, etc., but in no case forwarded. If the incoming packet is part of a flow that the checking functionality has already passed judgment on, then the switch can perform the action directed by the checking functionality 508. If the packet is not part of a suspect flow, it goes on to stage #3.

Stage #3 uses the switch ASIC instructions created by the distribution algorithm to see whether this packet is of interest or not 510. If not of interest, perhaps because no match was made, the ASIC forwards on the traffic as normal 512. If a match is made, then the packet goes on to stage #4, where a decision is made whether to send the packet on to the checking functionality 514.

Stage #4 uses the switch ASIC instructions as they will have directed whether a matched packet needed to be sent to the checking functionality or not. As seen with the first sample rule, e.g., RULE #1 (described in connection with the distribution algorithm) there may be rules for which the ASIC can perform all processing required of the rule 516. If the ASIC instructions require the packet to be sent to the checking functionality, the packet is sent on to stage #5.

Stage #5 consists of appending an ASIC context 518, e.g., SID, unique ID, flow ID, etc., to the packet to be able to tell the checking functionality why the ASIC is sending the packet to it. The ASIC context may contain information such as the flow identifier, reason codes, signature ID (SID), etc. In some embodiments, the context has the minimum amount of information for the checking functionality to understand why it received the packet and how to distinguish it from other packets/flows. Stage #6 consists of passing the packet and associated context from the ASIC to the checking functionality 520, e.g., sending a packet to an IPS.

As shown in the example embodiment of FIG. 5, for each packet received in flow_n received from the ASIC 522, in stage #7 the checking functionality executes instructions to parse the ASIC context, e.g., extract, ASIC context and associate with local context. This allows the checking functionality to identify and associate the incoming packet with a context local to the checking functionality, e.g., selecting patterns provided to the checking functionality for pattern searching. With the local context retrieved, e.g., patterns selected, the checking functionality can evaluate the packet in stage #8 against the checking functionality instructions created by the distribution algorithm 526, e.g., perform a pattern matching analysis based on slow logic plane instructions provided by the distribution algorithm.

In the case of no matches, execution goes to stage #9 where the checking functionality makes a determination whether there is any possibility that additional packet traffic could result in a positive match 528, e.g., determine where there are still matches that could conceivably hit with additional traffic. For example, if all of the checking functionality rules are looking for attacks in the first 2K bytes of flow traffic, then inspecting traffic after the first 2K if for naught and there is zero probability of match detection. In this case, instructions will execute to tell switch flow_n no longer needs to be sent to the checking functionality 530. As the reader will appreciate, depending on the content of the original checking functionality rules, the distribution algorithm may be able to establish a general flow byte count limit, after which additional match inspection is unnecessary. In the above example embodiment, consisting of two rules, the byte count is at 16 bytes of the TCP data payload due to the second rule (first rule has a smaller byte limit). Inspecting beyond 16 bytes is useless in this example, since the appearance of the "VERSION I0AI" after the first 16 bytes is not of concern.

If in stage #9 the checking functionality makes a determination that there is a possibility that additional packet traffic could result in a positive match 528 then, according to embodiments, the collaboration algorithm will provide instructions to the switch to forward packets nominally 532. Alternatively, if the checking functionality establishes that no additional traffic is necessary for this flow the switch will no longer send traffic to the checking functionality as shown in stage #10, e.g., instructions execute at 530 to tell the switch flow_n no longer needs to be sent to the checking functionality. If additional traffic is necessary then in stage #11 the switch may be instructed to forward packets nominally at 532. If no additional traffic is necessary, the switch may be instructed to forward packets according to normal forwarding logic protocol logic in stage #11 instead.

In some embodiments, if a match was make in stage #8, execution can proceed directly to stage #12, where the checking functionality takes the action directed by the slow logic plane configuration instructions provided by the distribution algorithm 534 (e.g., alert, log packet, block packet, etc.). As shown in the example embodiment of FIG. 5, execution continues with stage #13 where the checking functionality decides whether it is necessary to instruct the switch ASIC to block all additional packet traffic 536 associated with this flow. As shown in stage #14, in most instances, once a flow has been identified as being malicious, the checking functionality will drop or block packets associated with this flow 538, e.g., tell switch flow_n is to be blocked. According to embodiments, rather than have the checking functionality, e.g., slower logic plane, block the malicious flow, the checking functionality can instruct the switch, e.g., faster logic plane, to block the flow natively. Hence, if the determination is made at stage #13 that the flow should be blocked, then the checking functionality instructs the switch and the switch can react to such instructions in stage #2. That is, the collaboration algorithm communicates a status from the second logical entity to the first logical entity which can instruct the first logical entity to enforce traffic flow decisions. For example, the first logical entity can operate on network packets to perform an action selected from the group of; dropping packets, permitting packets, rate limiting packets, etc., based on the status information communicated from the second logical entity. In some embodiments, the collaboration algorithm instructs the first logical entity to change the number of pre-conditions configured on the first logical entity based on the status communicated from the second logical entity. For example, the instructions can execute to change an access control list (ACL) policy applied to packets received from a particular port and/or client.

In some embodiments the computer executable instructions associated with the collaboration algorithm utilize the bi-direction communication path between the first logical entity and the second logical entity to forward network packets that match the number of pre-conditions to the second logical entity along with the satisfied pre-conditions and the set of pattern indices. For example, according to some embodiments, logic on the network chip 240-1 can mirror-steal a packet which has satisfied the number of pre-conditions to the checking functionality (CF) 250-1, 250-2, 241, 270, 260, etc.

In some embodiments the logic will tunnel encapsulate selected, "mirror-stolen", data packets and can forward those packets to the network appliance 250-1 through a secure tunnel, e.g., 290 in FIG. 2. As used herein the term "mirror-stealing" means the packet is denied access to requested ports and a copy of the packet is forwarded to the CF. One example of the manner in which a "mirror-stolen" packet can be forwarded to a network appliance is provided in a co-pending, commonly assigned U.S. patent application Ser. No. 11/712,706, entitled, "Packet Tunneling", by inventors Bruce LaVigne, et. al., filed Mar. 1, 2007, which is incorporated in full herein. The same is not described more fully herein so as not to obscure embodiments of the present invention.

In some embodiments, the CF may choose to drop a suspicious packet received from the mirror-stealing operation. However, if a packet passes the checking functionality applied by the network appliance, e.g., is "cleared", the logic of a network device associated with the network appliance will securely tunnel encapsulate the packet and can forward the packet to the originating switch, e.g. switch 218-1. One example of the manner in which the logic of the network device associated with the appliance can securely tunnel encapsulate the pack and forward the packet to the originating switch is provided in a co-pending, commonly assigned U.S. patent application Ser. No. 11/788,179, entitled, "Marked Packet Forwarding", by inventors Bruce LaVigne, et. al., filed Apr. 19, 2007, which is incorporated in full herein. The same is not described more fully herein so as not to obscure embodiments of the present invention.

Upon arrival at the originating switch, this switch may allow the packet to be forwarded based upon application of regular forwarding logic. One example of the manner in which an originating switch, e.g., 218-1, may forward a returned "mirror-stolen" packet to be sent out ports is provided in a co-pending, commonly assigned U.S. patent application Ser. No. 11/784,664, entitled, "Locating Original Port Information", by inventors Bruce LaVigne, et. al., filed Apr. 9, 2007, which is incorporated in full herein. The same is not described more fully herein so as not to obscure embodiments of the present invention.

According to various embodiments, the instructions communicated back to the first logical entity, e.g., switch 318 in FIG. 3, can include an instruction to allow network packets to be forwarded using regular forwarding logic, an instruction to deny network packets based on the evaluation, an instruction to rate limit packets based on the evaluation, etc. An example of rate limiting packets in association with an evaluation of particular packet behavior is provided in copending, commonly assigned U.S. patent application Ser. No. 11/710,804, entitled "Network Traffic Monitoring", by Shaun Wackerly, filed on Feb. 26, 2007, the same of which is incorporated herein by reference. As the reader will appreciate, computer executable instructions stored on memory and executable by a processor on a switch, e.g., 318 can execute to implement any number of variations on the above describe actions.

In certain embodiments, the instruction communicated back to the first logical entity from the second logical entity can include instructions to dynamically adjust the pre-conditions provided to the network device, e.g., 318. For example, the network device may have been provided with an initial set of pre-conditions to be applied to packets received from a particular network port on the network device in association with a known network user, e.g., a particular network client such as 214-1 in FIG. 2. These pre-conditions may be applied as part of an access control list (ACL) policy applied to packets received from the particular port. According to some embodiments, the instruction received from the checking functionality can operate to change the ACL policy applied to packets received from this particular port in response to a change in the behavior of the network user or in relation to a new user joining the network. Hence, in some embodiments the logic and software described herein are operable to apply packet traffic policies on per user basis and adjust as new users come on to the network.

That is, as instructions are communicated back to the network device from the checking functionality, using the bi-directional communication path, e.g., via the communication algorithm, the computer executable instructions on the network device can execute to update, e.g., change, the set of checking functionality pre-conditions used by the hardware, e.g., ASICs, on the network device. In this manner, computer executable instructions operable in connection with the distribution algorithm and the communication algorithm can adjust to packet traffic as new network clients are added to the network, and as the behavior of existing network clients change.

According to certain embodiments, providing the bi-directional communication between the first logical entity and the second logical entity includes communicating a status, e.g., instruction, associated with forwarded network packets back to the first logical entity. The first logical entity can then proceed to enforce traffic flow decisions on network packets based on the status communicated from the second logical entity.

Some embodiments of the present invention use the a combination of the distribution algorithm and the collaboration algorithm such that the second logical entity operates to select patterns, indexed by a received set of pattern indices, to perform a pattern search on network packets and communicate a status back to the first logical entity without processing the same information on the second logical entity as was already performed in the first logical entity. According to embodiments, the checking functionality only performs pattern searches on packets when the number of pre-conditions has been satisfied.

Figure 6:
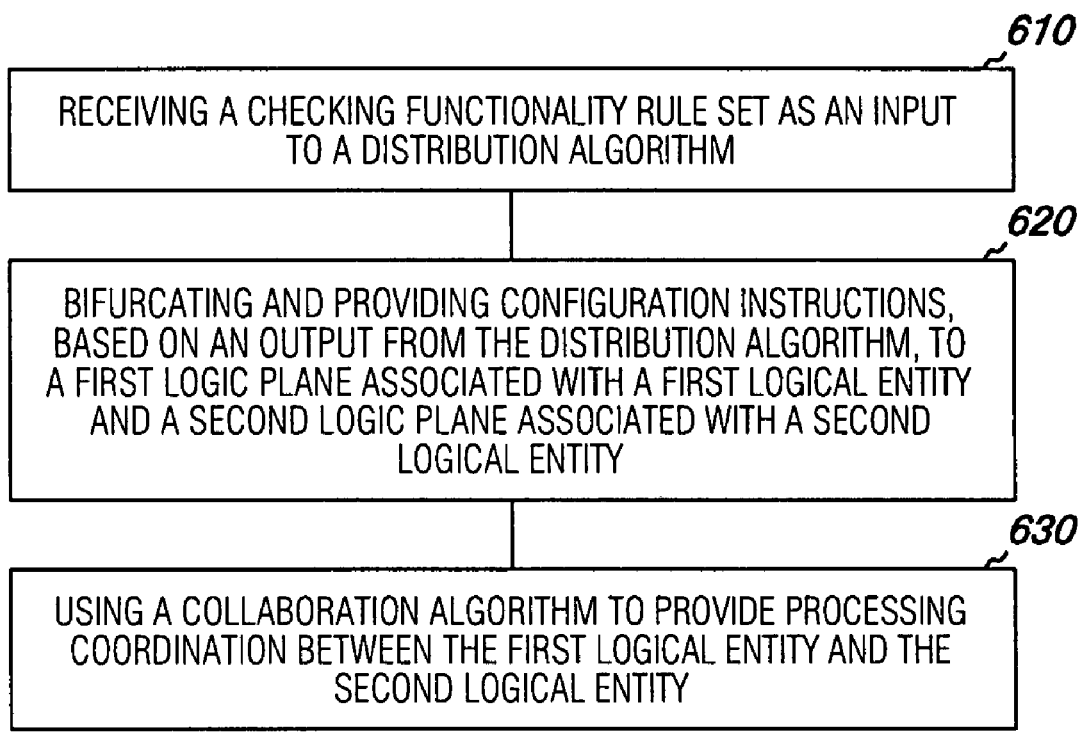
FIG. 6 illustrates a method for packet processing according to an embodiment of the present invention.

FIG. 6 illustrates a method for packet processing according to an embodiment of the present invention. As shown in the embodiment of FIG. 6 at block 610, the method includes receiving a checking functionality rule set as an input to a distribution algorithm. At block 620, the method bifurcating and providing configuration instructions, as an output from the distribution algorithm, to a first logic plane associated with a first logical entity and a second logic plane associated with a second logical entity. The method further includes using a collaboration algorithm to provide processing coordination between the first logical entity and the second logical entity, as shown at block 630. Software and/or logic, which is operable to perform the method described in connection with FIG. 6 can be present in whole or in part in embodiments of other figures. Embodiments, however, are not limited to the example given herein.

It is to be understood that the above description has been made in an illustrative fashion, and not a restrictive one. Although particular embodiments have been illustrated and described herein, those of ordinary skill in the art will appreciate that other component arrangements and device logic can be substituted for the particular embodiments shown. This claims are intended to cover such adaptations or variations of some embodiments of the disclosure, except to the extent limited by the prior art.

In the foregoing Detailed Description, some features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A method for processing packets, comprising:
receiving a checking functionality rule set as an input to a distribution algorithm;
bifurcating and providing configuration instructions, using a processor, as an output from the distribution algorithm, to a first logic plane associated with a first logical entity and a second logic plane associated with a second logical entity;
using a collaboration algorithm to provide processing coordination between the first logical entity and the second logical entity;
using the configuration instructions provided to the first logic plane to enforce a packet traffic policy; and
appending an ASIC context to a matched packet and forwarding the matched packet to the checking functionality,
wherein the first logical entity is a network switch and the second logical entity is a checking functionality.

2. The method of claim 1, wherein the method includes using the configuration instructions provided to the second logic plane to extract the ASIC context and associate the ASIC context with a context local to the checking functionality.

3. The method of claim 2, wherein the method includes using the configuration instructions provided to the second logic plane to take action on a forwarded packet 4. The method of claim 3, wherein the method includes using the collaboration algorithm to instruct the first logic plane to enforce a different packet traffic policy based on analysis of a forwarded packet.

5. The method of claim 1, wherein receiving the checking functionality rule set as the input to the distribution algorithm includes receiving intrusion prevention system (IPS) signatures.

6. The method of claim 1, wherein the method includes receiving the fast logic plane configuration instructions and n-tuple flow information as an input to the collaboration algorithm.

7. The method of claim 1, wherein the method includes using the distribution algorithm to create a set of switch ASIC primitives and switch CPU management instructions for the first logical entity.

8. The method of claim 7, wherein the method includes processing layer 2 to layer 4 packet information using the set of switch ASIC primitives.

9. The method of claim 1, wherein the method includes using the second logic plane to only process packet information which could not be handled by a set of ASIC primitives and switch CPU management instructions.

10. A network system, comprising:
a number of network devices having processor and memory resources;
a checking functionality associated with at least one network device; and
wherein the system includes logic and computer executable instructions stored in memory and executable by processor resources to:
receive a checking functionality rule set as an input to a distribution algorithm;
provide separate configuration instructions, as an output from the distribution algorithm, to a first logic plane associated with the at least one network device and to a second logic plane associated with the checking functionality; and
use a collaboration algorithm to provide processing coordination between the at least one network device and the checking functionality,
wherein the checking functionality is configured with patterns which can be indexed by a set of pattern indices associated with packets that have satisfied a number of pre-conditions in processing on the first logic plane, operates to perform a pattern search only when the number of pre-conditions has been satisfied,
wherein the distribution algorithm executes instructions to output separate configuration instructions to the network device and the checking functionality such that the checking functionality does not process packet information which the number of pre-conditions have already expressed, and
wherein first logic plane appends an ASIC context to a matched packet and forwards the matched packet to the checking functionality when a number of pre-conditions have been satisfied according to the configuration instructions provided to the first logic plane.

11. The system of claim 10, wherein the second logic plane extracts the ASIC context and associates the ASIC context with a context local to the checking functionality.

12. The system of claim 11, wherein the checking functionality is operable to return status information, relating to forwarded packets, to the at least one network device using a bi-directional communication path between the checking functionality and the network device.

13. The system of claim 12, wherein the first logic plane dynamically adjusts handling network packets on the network device based on the status information.

14. The system of claim 13, wherein based on the status information the first logical plane can operate on network packets to perform an action selected from the group of:
dropping packets;
forwarding packets;
tunneling packets;
traffic shaping packets;
permitting packets; and
rate limiting packets.

15. A non-transitory computer readable medium having instructions stored thereon which are executable to cause a device to perform a method, comprising:
providing intrusion prevention system (IPS) signatures as an input to a distribution algorithm;
generating different configuration instructions, as an output from the distribution algorithm, to provide to a first logic plane associated with a first logical entity and to a second logic plane associated with a second logical entity;
providing the different configuration instructions generated by the distribution algorithm and providing n-tuple flow information as inputs to a collaboration algorithm; and
using the collaboration algorithm to provide packet processing coordination between the first logical entity and the second logical entity.

* * * * *

UNITED STATES PATENT AND TRADEMARK OFFICE
CERTIFICATE OF CORRECTION

| | |
|---|---|
| PATENT NO. | : 7,849,503 B2 |
| APPLICATION NO. | : 11/809512 |
| DATED | : December 7, 2010 |
| INVENTOR(S) | : Mauricio Sanchez et al. |

It is certified that error appears in the above-identified patent and that said Letters Patent is hereby corrected as shown below:

In column 15, line 27, in Claim 3, delete "packet" and insert -- packet. --, therefor.

Signed and Sealed this
Eighth Day of November, 2011

David J. Kappos
*Director of the United States Patent and Trademark Office*